Aug. 25, 1959  E. V. HERBERT  2,900,724
STRATAPLOTTER

Filed Feb. 7, 1956  2 Sheets-Sheet 1

INVENTOR
EDWARD V. HERBERT
BY
ATTORNEYS

Aug. 25, 1959  E. V. HERBERT  2,900,724
STRATAPLOTTER
Filed Feb. 7, 1956  2 Sheets-Sheet 2

INVENTOR
EDWARD V. HERBERT
BY
ATTORNEYS

United States Patent Office 2,900,724
Patented Aug. 25, 1959

2,900,724
STRATAPLOTTER

Edward Vernon Herbert, Calgary, Alberta, Canada, assignor, by mesne assignments, to California Research Corporation, San Francisco, Calif., a corporation of Delaware Application February 7, 1956, Serial No. 563,988

5 Claims. (Cl. 33—1)

This invention relates in general to seismic prospecting and relates more particularly to methods and apparatus for plotting and analyzing the data obtained in such prospecting.

In the art of seismic prospecting, seismic waves artificially generated in the earth are utilized to activate a plurality of seismic detectors which are responsive to reflections and refractions of the waves from subsurface strata to produce electrical output signals varying in sympathy with the received waves. The seismic detector signals or traces are suitably recorded, usually by means of an oscillographic camera, and then analyzed to determine the presence in the traces of reflected energy or other events of interest. In analyzing the seismic record, it is desirable to compensate for the intertrace time variations in order more accurately and more readily to determine alignments across the record or events indicative of the presence of a reflecting horizon or other structure of interest. Heretofore the most common method of handling these intertrace time variations has been to calculate the values of the different corrections required and either enter the corrections as notations on the seismic record or on special computation sheets.

One of the most important considerations in connection with the problem of intertrace time variations is the large number of conventional oscillographic camera seismic records which have been produced through the years in seismic prospecting and which might be subject to better interpretation if quicker and more economical methods were available for presenting the data from records with the required time corrections therein. These records, plus those now being produced on conventional seismic crews, are usually plotted in the form of a cross-section which is constructed on the basis of an interpretation of the individual records. The types of seismic cross-section normally used today fall far short of meeting the requirements of most modern exploration problems. A considerable amount of the useful information available on a record often does not appear on the final section, and the assembling of the data which is presented on the cross-section normally includes some interpretation. The logical, and preferable, order of procedure is to assemble first all the required data in a factual form and then begin the interpretation. In a major part of present-day exploration the search is for anomalies which are very small in both vertical and horizontal extent, or of a stratigraphic nature. A close quantitative and qualitative study of all the available seismic evidence when combined with a knowledge of the subsurface geology of the area is probably the best approach to the detection of these types of features. It is desirable to produce a cross-section on which is assembled all available seismic information, including such features as reflection character, interference patterns and relative amplitudes of reflections, with a maximum density of control.

Broadly, the present invention contemplates methods and apparatus for plotting seismic records to remove the effects of intertrace time variations among the different traces on the original record. The present invention utilizes a plotting device having a record table on which a conventional seismic record may be mounted for movement relative to a transparent template member having indices thereon corresponding to some or all of the required time corrections to be introduced. The template overlies the record and is in turn overlaid by a sheet of transparent plotting paper which is fixed relative to the template during the plotting of a given trace. The corrected seismic record is plotted trace by trace on the transparent plotting paper. A selected index on the template is aligned with the corresponding index on the seismic record to produce alignment of a selected time begin, and as the tracing continues, the record table and attached seismic record are moved to maintain each index on the seismic record in alignment with the corresponding index on the template at the point of tracing.

Normally the indices on the seismic record are the timing lines, which extend transversely of the traces and which are usually provided at intervals of either one-hundredth or one-fiftieth of a second, with the timing lines at intervals of one-tenth of a second being wider or heavier than the intervening lines. The template is provided with indices in the form of a time scale, consisting of lines numbered to correspond to the time intervals represented by the timing lines on the seismic record and having curvatures corresponding to the time corrections required for the different seismic traces. Thus, in the representative case of a "split spread" method of seismic prospecting the template would be similar to an "umbrella" normal moveout chart and would comprise a series of curved time scale lines which extend generally in the same direction as the seismic record timing lines and which are symmetrical about a center longitudinal axis. The template is also provided with spaced longitudinal lines intersecting the time scale lines and corresponding to the different detector spacings or offsets from the shot point.

The spacing of the time scale lines along the central longitudinal axis, which axis corresponds to the shot point on the seismic record, is nearly identical to the spacing of the timing lines on the seismic record. The time scale lines are numbered in accordance with the times to which they correspond, the time being usually measured from the instant of creation of the seismic disturbance. For any particular offset spacing on the template, the departure of a given scale line from the normal to the intersection of that time scale line with the central zero offset axis represents the amount of normal moveout correction required for a seismic trace from a detector having that particular offset. Thus, for the early portions of a seismic trace from a detector having a large offset, the required correction will be large and the amount by which the record table and record must be moved to produce alignment of the selected record timing line with the corresponding template time scale line at the point of tracing will be correspondingly large.

The plotting apparatus of the present invention comprises a record table assembly which is movable relative to a frame member to which are secured the template and the plotting paper. The record table may be moved longitudinally of the template under the control of an operator to produce the alignment of timing lines and time lines discussed above, and may also be adjusted transversely of the template prior to tracing to align the detector trace which is to be copied with the corresponding offset line on the template. The template may be adjusted longitudinally of the plotting paper and the seismic record at the point at which the tracing is to scale line on the template with the corresponding record timing line at the start of the tracing. The purpose of this latter adjustment is to set the template so that events on the seismic record will appear at the desired position on the plotting paper when corresponding timing lines on the template and the seismic record are brought into alignment under the control of the operator.

The objects and advantages of the present invention will be further apparent from the following description when read in connection with the accompanying drawing, in which.

Figure 1:
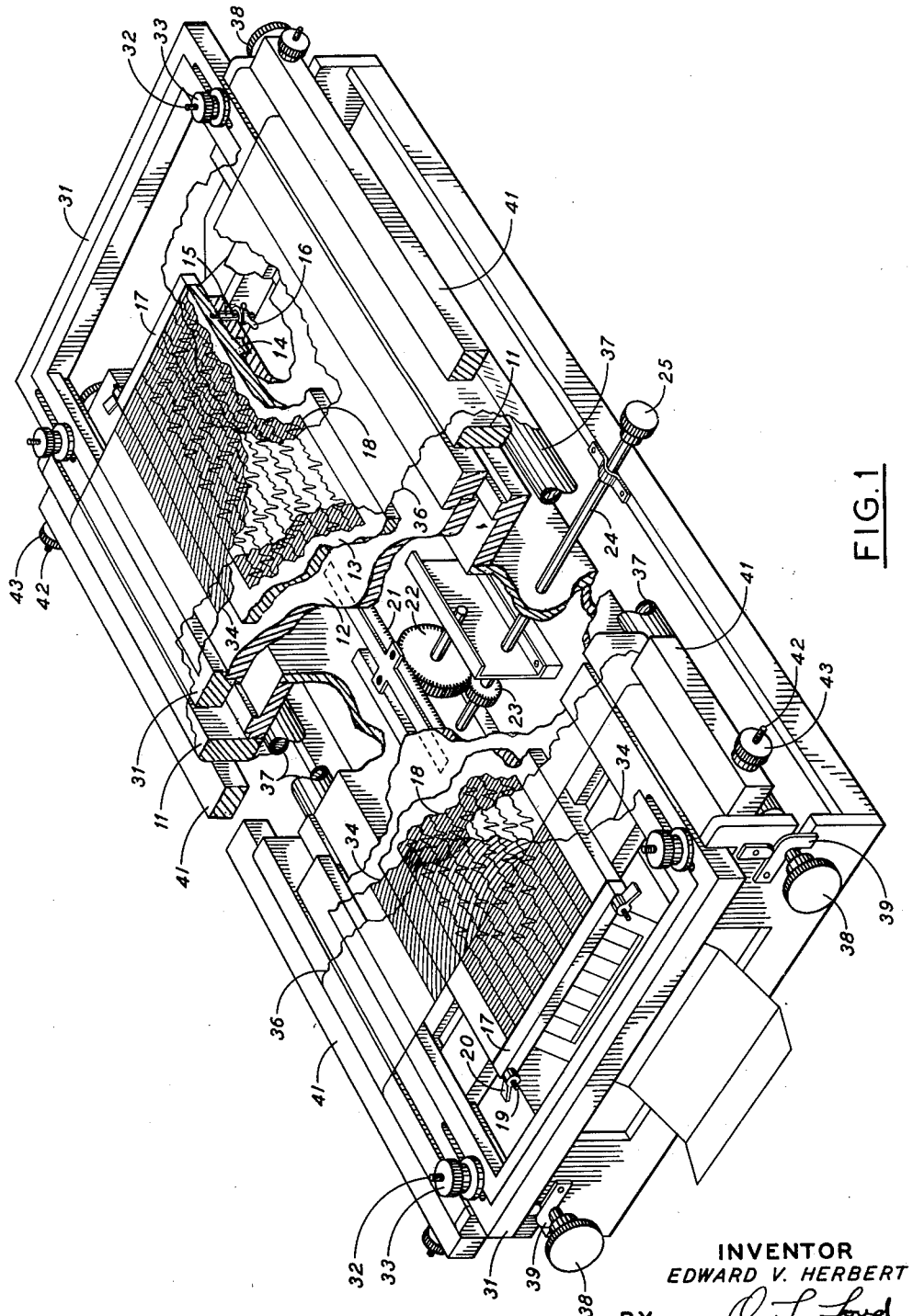
Fig. 1 is a perspective view of one form of plotting apparatus of the present invention.

Referring to Fig. 1 by character of reference, numeral 11 designates generally a frame member on which the elements of the plotting assembly rest. The plotter further comprises a record bed 12 of generally rectangular shape which is supported by a shoulder portion of frame member 11. Record bed 12 is overlaid by a record table member 13 of generally rectangular shape and having a pair of guide pieces 14 near the ends for engagement in corresponding grooves in record bed 12. The grooves in record bed 12 extend laterally on either side of record table 13 to guide the record table in movement laterally of the record bed. Record table 13 is also provided at each end with means for adjusting the position of the record table relative to the record bed. Such means may be a rack and pinion arrangement operated by a shaft under the control of the operator. Alternatively, as shown in Fig. 1, the record table may be clamped by studs 15 which are movable in laterally extending slots in record bed 12. Wing nuts 16 on studs 15 are provided for clamping the record table firmly to the record bed in any desired position.

Clamping bars 17 are provided at each end of record table 13 for clamping a seismic record 18 to the record table. Bolts 19 having nuts 20 are provided to engage slots at the ends of clamping bars 17 to press the clamping bars firmly against the ends of record table 13. Suitable means are provided for moving the record bed and record table assembly longitudinally of the plotting assembly. Such means, for example, may comprise a rack and pinion arrangement consisting of a rack member 21 secured to the bottom of record bed 12 and having teeth therein which engage the corresponding teeth of a pinion or gear 22. Pinion 22 in turn is driven from a smaller pinion 23 which is mounted on a shaft 24 extending through frame 11 and terminating in a hand wheel 25. Thus, rotation of wheel 25 produces movement of record bed 12 and record table 13 longitudinally of the plotting assembly, the ratio of the diameters of gears 22 and 23 acting as a gear reduction unit to permit accurate control of the position of the record bed and record table assembly. Although a handwheel has been illustrated for driving the record table and record bed, it will be understood that such control could be effected through the use of a foot-actuated linkage or through a suitable motor drive controlled by hand or through a foot treadle.

A template frame 31 is disposed above the record bed and record table on another shoulder portion of frame 11. Studs 32 extend upward from frame 11 through slots near the corners of template frame 31 and are provided with wing nuts 33 for clamping template frame 31 relative to the rest of the assembly. A transparent template 34 is disposed on template frame 31 and is clamped in the desired position by wing nuts 33 and the associated washers. Template 34 preferably fits snugly up against studs 32 to prevent any lateral movement of the template.

Template frame 31 and template 34 are overlaid by a sheet of preferably transparent plotting paper, portions of which are indicated by reference character 36, on which the seismic detector signals from the original seismic record are transcribed during the plotting operation. Plotting paper 36 is wound on reels 37 which are rotatable through knobs 38. Reels 37 have portions of reduced diameter at the ends thereof for engagement with retaining hooks 39 which are pivotally secured to frame 11. Plotting paper 36 is clamped in position relative to the plotting assembly by a pair of clamping bars 41 which are pressed against the frame by tightening wing nuts 43 on studs 42.

Figure 3:
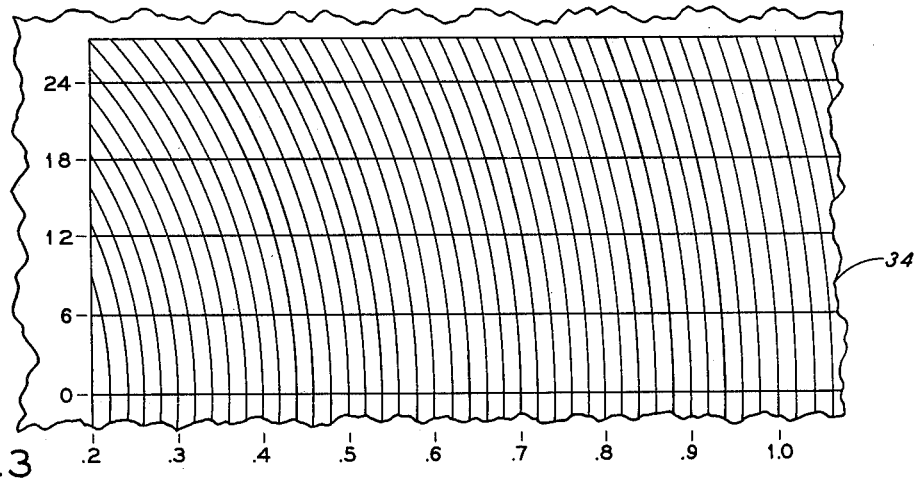
Fig. 3 illustrates a portion of a template for use with the seismic record shown in Fig. 2.
Figure 2:
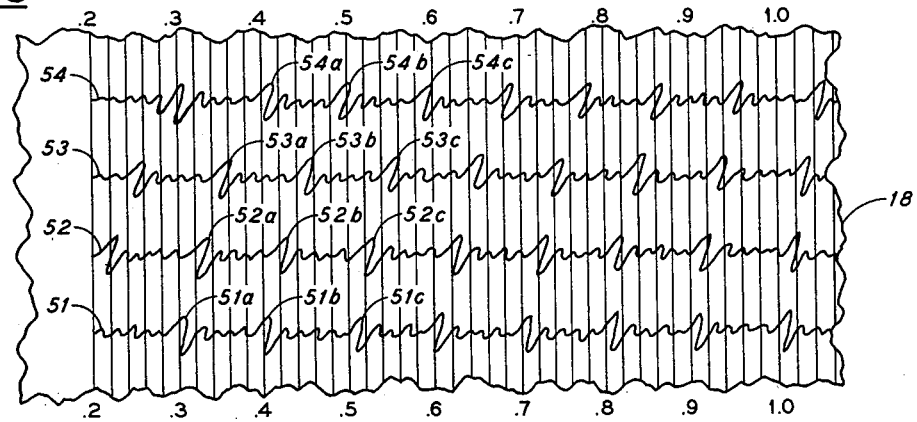
Fig. 2 illustrates a portion of a representative seismic record which may be replotted in accordance with the present invention.
Figure 4:
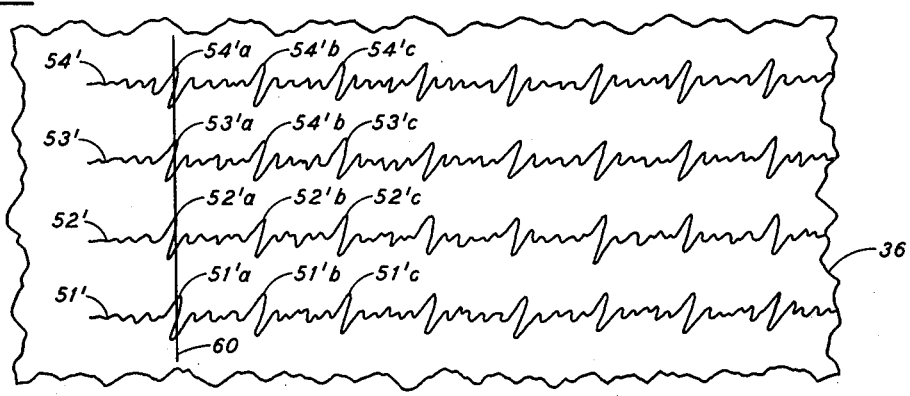
Fig. 4 illustrates a portion of a plotted seismic section representing the replotting of the seismic record of Fig. 2 in accordance with the present invention.

The principles of operation of the present invention may best be understood by considering Figs. 2, 3, and 4, which show a representative form of seismic record, a template for use therewith, and the resultant plotted data. Fig. 2 illustrates a portion of a representative seismic record in which detector traces or signals are shown as 51, 52, 53, and 54. The record is also provided with suitable timing lines or marks extending transversely of the detector signals, the times indicated by the timing lines corresponding to the elapsed time from the seismic disturbance. Although the timing lines shown on the representative seismic record of Fig. 2 occur at intervals of one-fiftieth of a second, it will be understood that intervals of one-hundredth of a second or some other suitable interval could be utilized. Although, for simplicity, only four traces have been illustrated in Fig. 2, in practice a considerable number of such traces are usually present on a record. For example, when the "split spread" method of shooting is utilized, with the detectors disposed along a line running through the shot point, another group of signals would be produced which would be substantially the mirror image of signals 51 through 54.

In the representative seismic signals shown in Fig. 2, each of the different signals has corresponding first peak portions 51a, 52a, 53a, and 54a, respectively, and these first peak portions are displaced from each other in time by various amounts. A curve running through peaks 51a through 54a would roughly correspond to the normal moveout function for the reflecting horizon corresponding to those reflections, taking into account the fixed intertrace time variations involved. Signals 51 through 54 also each have corresponding second peaks 51b, 52b, 53b, and 54b, which are displaced from each other in time by smaller amounts than are peaks 51a through 54a. Additional common peak portions 51c through 54c are also indicated, with the time variations between occurrences of these peaks decreasing in value with respect to peaks 51a through 54a and 51b through 54b.

Fig. 3 illustrates a portion of the type of template which would be utilized in connection with the plotting of a record similar to that shown in Fig. 2. As shown in Fig. 3, the template includes a plurality of spaced horizontal lines corresponding to the different offsets utilized in the spread, the line labelled zero corresponding to the position of the shot point and the other horizontal lines corresponding, respectively to offsets of 600 ft., 1200 ft., 1800 ft., and 2400 ft. from the shot point. The template is also provided with a plurality of curved time scale lines corresponding to the normal moveout correction for different times subsequent to the seismic disturbance. The different time scale lines are labelled similarly to the timing lines on the seismic record and the spacing between the time scale lines along the zero offset axis is identical with the spacing of the timing lines on the seismic record.

The template is constructed from a knowledge of the normal moveout variations in the surveyed area and different templates having different configurations of the time scale lines will be constructed for different areas. Similarly, when the present invention is utilized in connection with plotting a seismic record obtained by the split-spread method of shooting, the template will comprise another portion similar to the portion shown in Fig. 3 and symmetrical therewith about the zero offset axis.

In utilizing the present invention in connection with a record similar to record 18, the record is clamped to record table 13 by clamping bars 17, and template 34 and plotting paper 36 may then be laid over the record. The ends of the plotting paper 36 are secured to reels 37, and the paper is stretched taut and then clamped in position by clamping bars 41. The position of record table 13 and record 18 is then adjusted laterally in the grooves in record bed 12 to align the quiescent portion of the signal to be traced with the appropriate offset line on the template. That is, assuming that it is desired to trace signal 51 on the plotting paper and that signal 51 corresponds to an offset of 600 ft., record table 13 is adjusted in the grooves of the record bed 12 until the quiescent portion of signal 51 is aligned with the horizontal line on template 34 corresponding to a 600 ft. offset. Record table 13 may then be clamped relative to record bed 12 by tightening wing nuts 16 on studs 15.

The plotting is preferably done utilizing a key reflection on the seismic record as a datum point or line to be transcribed to the plotting paper. The key reflection should be the most reliable cycle of the most continuous event in the surveyed area. For example, the reflection from the Lower Cretaceous Blairmore formation is strong and continuous over most of Alberta, Canada, and I have found that this reflection forms a very satisfactory reference event for prospecting in that area. This reference event is aligned with a reference or datum line which is put on the cross-section plotting paper prior to attaching it to the rollers, The reference line may be a straight line which is parallel to one edge of the plotting paper, and in this case the resultant plotted seismic cross-section has no structural significance but it does contain such information as reflection amplitude, reflection character and reflection time intervals. Alternatively, the reference line may be disposed on the plotting paper in a manner which represents the true time structure for the key reflection. In this case, the section provides information regarding not only reflection amplitude, reflection character and reflection time intervals, but also true time structural altitudes.

Assuming that the plotting is done utilizing a key or known reflection on record 18 as a reference reflection, and that the reflection represented by peaks 51a, 52a, 53a, and 54a is the key reflection, this reference event is aligned with a reference or datum line 60 which is drawn on the section paper prior to securing the paper to rolls 37. It will be noted that in this assumed example, datum line 60 is parallel to the edge of plotting paper 36 and thus has no structural significance, as discussed above. The alignment of the reference event with the reference line is produced by turning handwheel 25 to drive the record table and record bed longitudinally to the desired position.

Template 34 is then shifted longitudinally of the template frame until the time scale line on the template coincides with the corresponding timing line on record 18 at the point at which the tracing is to begin. That is, again assuming that signal 51 is to be plotted and that the tracing is to begin at the timing line nearest the reference event, i.e., the .3-second line, template 34 is shifted longitudinally in the template frame until the point of intersection of the 600 ft. offset line and the .3-second time scale line overlies the .3-second timing line on the record. The position of the template is then fixed relative to the plotting paper by tightening wing nuts 33. In the particular instance illustrated in Figs. 2, 3, and 4, the reference event happens to be located in the earliest portion of record which can be traced, since the first .1 second or .2 second of a record is usually unsuitable for tracing, but it should be understood that the reference event is not necessarily located at the earliest portion of the record.

The selected trace is then transcribed to the plotting paper by following the selected trace with a pencil while maintaining a template time scale line and the corresponding record timing line in coincidence at the point of tracing. The amount of movement which is necessary to keep the two time scales in continuous alignment is a measure of the adjustment which is being made to remove normal moveout.

In the representative embodiment illustrated in Fig. 2 the moveout correction for trace 51 is relatively small, since the detector corresponding to this trace is located nearest the shot point. However, some shift in the position of peak 15a will result in the plotting operation, the amount of the shift being determined by the amount by which the intersection of the 600 ft. offset line and the .3-second time scale line differs from the position of the .3-second time scale line at zero offset. The largest correction will, of course, be introduced in trace 54, since this trace corresponds to the detector located at the greatest distance from the shot point. For example, peak 54a of trace 54 will be shifted horizontally by an amount corresponding to the horizontal difference between the point of intersection of the .4-second time scale and the 2400-ft. offset line, and the point at which the .4-second time scale crosses the zero offset line. Similarly peak 54b will be shifted horizontally an amount corresponding to the horizontal difference between the intersection of the .5-second time scale line with the zero offset line and the intersection of this .5-second time scale with the 2400-ft. offset line, the correction for peak 54b being less than that for peak 54a since the moveout correction decreases in magnitude for deeper reflections.

The resultant plotted cross-section for traces 51, 52, 53, and 54 will appear as in Fig. 4, with plotted traces 51', 52', 53', and 54' representing the time-corrected traces from the original record. The resultant plotted section will, of course, contain a number of such corrected traces, and the advantages of such a type of presentation are manifold. The plotted section contains all information which was on the original records, and the plotted traces are easier to interpret with the intertrace time variations removed. In areas of little structural chage, a given reflection can be correlated with a straight-edged ruler based on several traces, using peaks, troughs, and nodal points to obtain the best fit. The character of the reflections and changes therein can be seen simultaneously over a large portion of the seismic line, allowing a much more complete and certain interpretation of the section. Additionally, partial reflections and marginal data are present, so that their relationship with the better data can be readily seen.

In the above-described embodiment it was assumed that there was available on the record a reflection of sufficient reliability to be used as a key reflection with which to align the reference line on the plotting paper. However, even where there is no sufficiently reliable reflection available, the section can be plotted as follows. A reference line is drawn on the plotting paper using a record timing line as a guide, such as, say the 1.0-second timing line. The weathering correction is computed to a level reference plane for each trace to be copied, this correction including the time-break and any filter lag or lead. The 1.0-second timing line on the record is then aligned with the reference line on the plotting paper. The record is then shifted longitudinally an amount corresponding to the above correction and the template position is adjusted to align the template time scale line with the corresponding record timing line at the point at which tracing is to begin. The template position is then fixed and tracing may commence, keeping the time scale line and corresponding timing line in coincidence at the point of tracing, as discussed above.

Although it has been assumed in the above-described operations that the section is plotted on a time basis, the section could alternatively be plotted on a depth or footage basis if desired. In such a case, variations in the seismic velocity with depth would be taken into account on the construction of the template. The use of such a template would normally require more movement of the record to produce the desired alignment during tracing, thus making the tracing somewhat less accurate than when the amount of record movement is smaller.

Although but a few illustrative embodiments of the present invention have been described, it will be apparent to those skilled in the art that various changes and modifications may be made therein without departing from the spirit of the invention or the scope of the appended claims.

I claim:

1. Apparatus for removing time variations from the traces of a seismic record containing a plurality of spaced timing lines comprising a record table for holding said record, a template frame overlying said record table for adjustably holding a transparent template having a plurality of time scale lines thereon corresponding to said timing lines and representing the required time corrections for the different traces, clamping means for clamping a sheet of transparent plotting paper over said template and in fixed relationship thereto, and drive means for moving said record table and said record longitudinally to successive positions at spaced intervals relative to said template and said plotting paper to maintain alignment between the said spaced timing lines on said record and corresponding said time scale lines on said template at the point of transcribing while a record trace is transcribed to said plotting paper.

2. Apparatus for removing time variations from the traces of a seismic record containing a plurality of spaced timing lines comprising a record table for holding said record, a template frame overlying said record table for holding a transparent template having a plurality of time scale lines thereon corresponding to said timing lines and representing the required time corrections for the different traces, a pair of reels on opposite sides of said template frame for holding a sheet of transparent plotting paper, clamping means for clamping said sheet of plotting paper over said template, and drive means for moving said record table and said record longitudinally to successive positions at spaced intervals relative to said template and said plotting paper to maintain alignment between the said spaced timing lines on said record and corresponding said time scale lines on said template at the point of transcribing while a record trace is transcribed to said plotting paper.

3. Apparatus for removing time variations from the traces of a seismic record containing a plurality of spaced timing lines comprising a record table for holding said record, a record bed for supporting said record table, said record bed having grooves therein engageable with projections on said record table for adjusting the position of said table laterally of said bed, means for clamping said record table relative to said record bed, a template frame overlying said record table for holding a transparent template having a plurality of time scale lines thereon corresponding to said timing lines and representing the required time corrections for the different traces, clamping means for clamping a sheet of transparent plotting paper over said template, and drive means engageable with said record bed for moving said record bed, said record table and said record longitudinally relative to said template and said plotting paper, whereby said traces may be transcribed to said plotting paper with said time variations removed by tracing said traces on said plotting paper while maintaining a timing line in alignment with the corresponding time scale line at the point of tracing.

4. Apparatus for removing time variations from the traces of a seismic record containing a plurality of spaced timing lines comprising a record table for holding said record, a template frame overlying said record table for holding a transparent template having a plurality of time scale lines thereon corresponding to said timing lines and representing the required time corrections for the different traces, clamping means for clamping a sheet of transparent plotting paper over said template, and handwheel means for moving said record table and said record longitudinally to successive positions at spaced intervals relative to said template and said plotting paper to maintain alignment between the said spaced timing lines on said record and corresponding said time scale lines on said template at the point of transcribing while a record trace is transcribed to said plotting paper.

5. Apparatus for removing time variations from the traces of a seismic record containing a plurality of spaced timing lines comprising a record table, first clamping means for clamping said record to said record table, a template frame overlying said record table for holding a transparent template having a plurality of time scale lines thereon corresponding to said timing lines and representing the required time corrections for the different traces, second clamping means for clamping a sheet of transparent plotting paper over said template in a fixed relationship thereto, means to restrain said record table to longitudinal movement relative to said template frame, and drive means for moving said record table and said record longitudinally relative to said template and said plotting paper to maintain alignment between the said spaced timing lines on said record and corresponding said time scale lines on said template at the point of transcribing while a record trace is transcribed to said plotting paper.

References Cited in the file of this patent

UNITED STATES PATENTS

| | | |
|---|---|---|
| 2,244,181 | Wood | June 3, 1941 |
| 2,348,411 | Petty | May 9, 1944 |
| 2,394,990 | Eisler et al. | Feb. 18, 1946 |
| 2,481,563 | Bevins | Sept. 13, 1949 |
| 2,550,238 | Gaede | Apr. 24, 1951 |
| 2,810,898 | Meiners | Oct. 22, 1957 |
| 2,821,892 | Merten | Feb. 4, 1958 |

FOREIGN PATENTS

| | | |
|---|---|---|
| 773,315 | France | Sept. 3, 1934 |
| 567,395 | Great Britain | Feb. 13, 1945 |

UNITED STATES PATENT OFFICE

CERTIFICATE OF CORRECTION

Patent No. 2,900,724　　　　　　　　　　　　　　　　　　　　August 25, 1959

Edward Vernon Herbert

It is hereby certified that error appears in the printed specification of the above numbered patent requiring correction and that the said Letters Patent should read as corrected below.

Column 2, line 15, for "to produce alignment of a selected time" read -- at the point at which the tracing is to --; column 2, line 71, for "at the point at which the tracing is to" read -- to produce alignment of a selected time --; column 6, line 15, for "15a" read -- 51a --; line 46, for "chage" read -- change --.

Signed and sealed this 22nd day of March 1960.

(SEAL)
Attest:

KARL H. AXLINE　　　　　　　　　　　　　　　　　　　　　　　ROBERT C. WATSON
Attesting Officer　　　　　　　　　　　　　　　　　　　　　　Commissioner of Patents